Patented June 5, 1928.

1,672,621

UNITED STATES PATENT OFFICE.

JOSEPH R. NELLER, OF PULLMAN, WASHINGTON, AND GEORGE M. VANCE, OF TULSA, OKLAHOMA, ASSIGNORS, BY MESNE ASSIGNMENTS, TO THE TEXAS COMPANY, OF NEW YORK, N. Y., A CORPORATION OF DELAWARE.

REFINING OIL.

No Drawing.     Application filed April 30, 1923.   Serial No. 635,766.

This invention relates to the treatment of hydrocarbons, such as petroleum oils, for the purpose of purifying and stabilizing them.

In the petroleum industry, as well as in other hydrocarbon oil industries, it is common practice to give certain of the oils a chemical treatment involving the use of acid and alkali in order to remove certain impurities from the oil. There are in use various methods of carrying out this chemical treatment and some of the processes have been more or less successful in improving the character of the oil. The chief difficulty, however, has been in making the improvement permanent. Thus the color of the oil may readily be improved by various methods of treatment but so far as we are aware no process has yet been devised by which a product may be produced which will not deteriorate in color on standing, as in storage and transportation. As a rule in general commercial operations no matter how thoroughly the purification treatment may be carried out, the oil treated will ultimately deteriorate to a greater or less extent. The lack of stabiliay is more marked in oils derived from certain crudes and in certain fractions of such oils than in others but with most oils treated in accordance with existing methods there is a greater or less lack of stability.

We have made an extensive investigation as to the causes for the lack of stability in the products of existing methods of treatment. Our experiments seem to indicate that the action involved in the increase of color on standing is a catalytic one. We have found, for instance, that the tendency to go off color is influenced by the composition of the receptacle in which the oil is contained; the presence of certain metals, such for example, as copper and tin, accelerate the development of color. The color increase is also more rapid under the influence of heat.

Now it is known that some organic compounds are colorless bodies with a certain arrangement of atoms in the molecule and become colored when the position of some of the atoms is changed. The sensitive photochemical nature of the color which develops in certain distillates of petroleum, particularly some of the kerosene fractions, would seem to indicate that the development of color may be due to some such rearrangement. At any rate, whatever may be the exact nature of the chemical change, it is a fact that the potential color-forming bodies remaining in the oil after the usual chemical and physical treatments exist in comparatively minute quantities. We have succeeded in isolating and extracting from the oil these color-forming bodies, or at least a material comprising them. The material thus extracted is of a resinous nature and gives an acid reaction. With this material removed the oil is found to be stable, its color and other physical characteristics remaining substantially constant even under long standing and even when subjected to severe conditions.

According to some authorities the sulfuric acid treatment of hydrocarbon oils produces neutral sulfonic esters which do not react with the alkali used in the subsequent treatment and which remain in the finished oil to undergo spontaneous changes later. It may be that these esters constitute color-inducing agents. But whatever may be the chemical composition or exact nature of the potential color-forming bodies they may be removed from the oil and the oil rendered stable in character by subjecting the oil to the method of treatment which we have devised.

In the practice of the invention the oil is treated with a reagent capable of removing the potential color-forming constituents. We have found that an alcoholic solution of an alkali has the property of freeing the oil from these color bodies. We do not attempt to explain the exact chemical reaction. It may be that there is a chemical action between the alkali constituents of the reagent and certain of the materials comprising the color-forming elements, which reaction is only rendered possible by reason of the close chemical contact resulting from the use of a mutual solvent of the oil and reagent. The fact that the color-forming bodies remaining in the oil after the usual treatments exist in such minute quantities and the fact that such a comparatively small amount of reagent is required to remove them from the oil would seem to indicate that such is the case. On the other hand it may be that the action is a solvent one and that an alcoholic solution of an alkali is a solvent of the potential color-forming materials. At any rate the treatment of the oil by certain reagents, the efficacy of which we have discovered, improves the character of the oil and stabilizes its properties.

In the preferred manner of carrying out the invention the oil is first treated with an acid, preferably a mineral acid, such as sulfuric acid, in any of the usual methods of applying the acid. The acid and resultant acid sludge are allowed to settle out and are removed. In the case of the lighter oils, such as gasoline, kerosene, and the like, the acid treated oil may be substantially neutralized by thoroughly washing with water. The sulfonic acids, for example, which are produced in the acid treatment are readily soluble in water and may easily be removed from the less viscous oils by this washing. Oil that has thus been thoroughly washed is considered neutral, since if the treatment has been properly conducted the oil will not show an acid reaction in any of the usual tests for acidity. A careful anaylsis of the oil, however, discloses the presence of the potential color-forming bodies which remain in the oil in comparatively minute quantities. The subsequent treatment with mere alkali reagents will not remove these bodies. Thus the oil may be treated with any of the usual alkali materials, as for example, with caustic soda and then, if necessary, given an additional treatment with sodium plumbite to render it satisfactory to the Doctor test. These treatments, however, do not insure the removal of the potential color-forming elements.

In the treatment of the more viscous oils, such as lubricating oils, it is impracticable to effect neutralization by washing with water due to the tendency to form emulsions and accordingly an alkali treatment is relied on to effect neutralization. The heavier or more viscous oils are accordingly treated with suitable alkali materials, such as caustic soda, soda ash and the like. This treatment neutralizes the oil and removes certain impurities therefrom but cannot be relied upon to effect a removal of the bodies which cause the oil to be unstable. Nor do the various finishing processes which have been applied to oils, such as filtrations through fuller's earth, agitation with fine clay and the like, effect a removal of these bodies. In fact the color-inducing agents cannot be removed by any of the usual physical and chemical methods of treatment as applied in commercial methods of operation.

In the preferred manner of carrying out our invention, after the oil has thus been suitably treated with acid and neutralized by washing, by treatment with an alkali or by combined washing and alkali treatment with separation and removal of resultant products of the reactions and given such other purifying treatment as may be desired, it is subjected to a treatment with a liquid comprising an alcoholic alkali. The reagent used is preferably an alcoholic solution of a fixed alkali, such as caustic soda, caustic potash and the like. Preferably an alcohol solution saturated with the alkali is used but the treatment may be carried out by the use of weaker solutions of alkali. The solvent used may be ethyl, methyl, isopropyl, or other suitable alcohol. We prefer to use ethyl or methyl alcohol. The denatured ethyl may be used. However, it is desirable, especially in treating the lighter colored oils, to employ an alcohol having a denaturant that will not discolor the oil. For example, we have used successfully ethyl alcohol denatured with a mixture of wood alcohol and a pyridin base, and with a mixture of sulfuric ether, benzine and pyridin. In treating the darker colored oils less care need be exercised in the choice of a denaturant. It is best to use a weak or dilute alcohol; concentrated solutions are less satisfactory.

The quantity of alcoholic alkali solution required is small as compared with the proportions of reagents usually employed in the treatment of oils in commercial operations. Thus, for example, in treating certain distillates, such as burning oil or kerosene fractions, in quantities of 2800 barrels, a wash with about 6 barrels of the alcoholic alkali solution has been found adequate. Our experience has been that the amount necessary in the case of oils which have been properly treated with acid, neutralized, and washed with alkali, is usually about 0.2% by volume of the amount of oil treated and the amount required should not exceed 0.5%. Of course greater quantities of the reagent may be employed but we would not recommend the use of larger proportions in view of the added expense involved. If the oil, after treatment with the acid, is properly neutralized so that it is substantially free from sulfonic acids and other acid bodies, either organic or inorganic, as indicated by the usual tests for acidity, and is substantially free from other impurities, such as certain sulfur compounds removable by the alkali treatment, it will be found that a quantity of alcoholic alkali liquid less than 1% by volume of the quantity of oil treated will produce the desired results and additional quantities used will only add to the expense of the treatment without giving any commensurate advantage. In the treatment of some oils, particularly when employing comparatively small sized apparatus wherein there is good contact between the oil and reagents the quantity of alcoholic alkali used may be as low as 0.1% or even less, but in ordinary commercial operations the amount required for satisfactory results will generally be as much as 0.2%.

In treating the oil with the reagent for removing the potential color-forming bodies the required contact between the oil and the reagent may be secured in various ways. For example, agitators or treating vessels of various types well known in the oil industries may be employed and the oil and reagent agitated by blowing or by agitation with mechanical means. The alcoholic alkali solution may also be employed in continuous treating processes wherein the oil and reagent are commingled by circulation through pipes or other mixing devices.

After the oil has thus been contacted with the alcoholic alkali the reagent is allowed to settle out leaving the purified and stabilized oil. If desired, the oil may be subjected to a further treatment, as is commonly employed in the finishing of oils for the market, such as blowing, filtration through fuller's earth or other decolorizing material, agitation with fine fuller's earth or other comminuted material, or by other brightening or finishing processes known in the art.

The invention is particularly adapted to the treatment of the lighter fractions resulting from the distillation of hydrocarbon oils, such as gasoline, naphtha, kerosene and the like, although it may also be used in treating heavier or more viscous oils.

In practicing the invention it is not necessary to neutralize the oil or treat with an aqueous alkali prior to the treatment with the alcoholic alkali. Thus the alcoholic alkali treatment may be given immediately after the acid treatment or it may be combined with the alkali treatment per se by subjecting the oil, after the acid treatment, to the action of an alcoholic alkali solution in quantity sufficient to completely neutralize any acid bodies in the oil and remove other impurities, the potential color-forming elements being removed at the same time. When, however, the alcoholic solution is used prior to neutralization or to a necessary alkali treatment a considerably greater quantity of the solution is required and for this reason it is preferable to first substantially neutralize the oil and also treat with alkali, if necessary, and then treat with alcoholic alkali.

One special field of usefulness for the invention is in the regeneration of oils in which oxidation has taken place with resultant increase in color and sometimes also the formation of gummy or resinous products. Such oils may be given a chemical treatment, such as a treatment with acid and alkali, and the treated oil then subjected to the action of an alcoholic alkali solution. The product obtained in this treatment is stable in character.

Obviously many modifications and variations of the invention as hereinbefore set forth, may be made without departing from the spirit and scope thereof and therefore, only such limitations should be imposed as are indicated in the appended claims.

What we claim is:

1. The process of refining and stabilizing hydrocarbon oils that comprises treating the oil with sulfuric acid, separating and removing resultant acid sludge from the oil, treating the oil with an alkali reagent to substantially neutralize the oil, separating and removing resultant products of reaction and then treating the oil with a relatively small quantity of alcoholic alkali in proportion sufficient to remove potential color-forming constituents from the oil.

2. The process of refining and stabilizing hydrocarbon oils that comprises treating the oil with sulfuric acid, separating and removing resultant acid sludge from the oil, washing the oil with water to substantially neutralize the oil and then treating the oil with a relatively small quantiy of alcoholic alkali in proportion sufficient to remove potential color-forming constituents from the oil.

3. In the refining of hydrocarbon oils, the step that consists in color-stablizing an acid-treated and neutralized oil by washing said oil with a relatively small quantity of alcoholic alkali solution in proportion sufficient to remove potential color-forming constituents from the oil.

4. In the refining of hydrocarbon oils, the step that consists in color-stabilizing an acid-treated and neutralized oil by washing said oil with an alcoholic alkali solution in quantity less than 1% by volume of the quantity of oil being treated.

5. The process of purifying and stabilizing hydrocarbon oils that comprises treating the oil with sulfuric acid and substantially neutralizing the oil, and then treating the oil with sodium plumbite and finally with an alcoholic alkali.

In witness whereof I have hereunto set my hand this 4th day of April, 1923.

J. R. NELLER.

In witness whereof I have hereunto set my hand this 23 day of April, 1923.

GEORGE M. VANCE.